Figure 1:
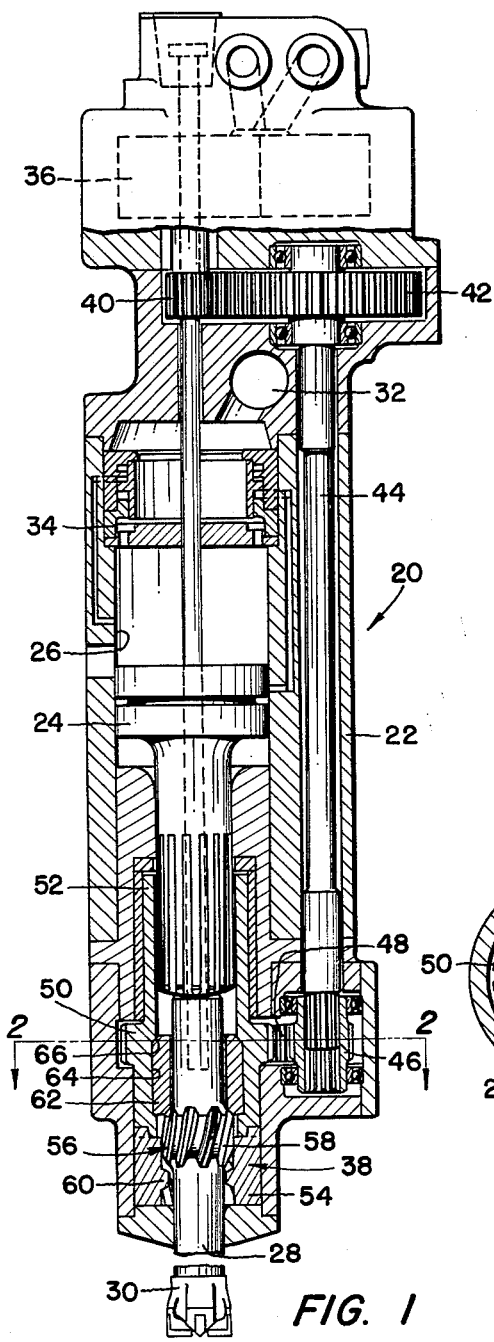

Jan. 19, 1965     M. WORMAN     3,166,131
ROTARY PERCUSSIVE ROCK DRILL HAVING COUNTER ROTATION MEANS
Filed Aug. 6, 1962     2 Sheets-Sheet 1

INVENTOR
MARTIN WORMAN
BY
*Arthur Frederick*
ATTORNEY

Jan. 19, 1965   M. WORMAN   3,166,131
ROTARY PERCUSSIVE ROCK DRILL HAVING COUNTER ROTATION MEANS
Filed Aug. 6, 1962   2 Sheets-Sheet 2

INVENTOR
MARTIN WORMAN
BY
*Arthur Frederick*
ATTORNEY

United States Patent Office 3,166,131
Patented Jan. 19, 1965

3,166,131
ROTARY PERCUSSIVE ROCK DRILL HAVING COUNTER ROTATION MEANS
Martin Worman, Phillipsburg, N.J., assignor to Ingersoll-Rand Company, New York, N.Y., a corporation of New Jersey
Filed Aug. 6, 1962, Ser. No. 215,114
6 Claims. (Cl. 173—105)

This invention relates to rock drills in general, and more particularly to improvements in the rotary percussive type rock drills. With the commonly known rotary percussive type rock drills in which the drill steel is actuated or struck by the piston during rotation of the drill steel, the drill steel as well as the drill bit connected to the forward end of the drill steel are subjected to severe stresses. The drill steel, at impact for penetration of the drill bit into the material being drilled, is subjected to excessive torsional stresses, since the forward end (the drill bit connected to the forward end of the drill steel) is frictionally held against the face of the material being drilled while the rear end of the drill steel is rotated. This causes substantial strain on the drill steel, and consequently, breakage thereof. Furthermore, the drill bit connected to the forward end of the drill steel, at impact of the drill steel during rotation thereof, is subjected to grinding against the face of the rock being drilled, causing excessive wear of the cutting inserts of the drill bit. Excessive wear of the drill bit and breakage of the drill steel result in frequent interruptions of the drilling operations, and consequently, considerable increase of maintenance and drilling costs.

The novel rotary percussive type rock drill, according to this invention, includes means to rotate the drill steel in response to forward movement of the drill steel when the drill steel is actuated or struck by the piston, such rotation being opposite to the direction of normal rotation of the drill steel and at a velocity equal to the velocity of normal rotation of the drill steel. This arrangement causes the drill steel and the drill bit attached thereto to be rendered rotationally stationary relative to the face of the material being drilled, each time the drill steel is actuated or struck by the piston for penetration of the drill bit into the material to be drilled, thus, eliminating the torsional stresses in the drill steel, and the grinding effects of the drill bit on the face of the material being drilled.

An object of this invention is to provide an improved rotary percussive type rock drill having means to substantially eliminate torsional stresses in the drill steel.

Another object of this invention is to provide an improved rotary percussive type rock drill having means to substantially eliminate grinding of the drill bit against the face of the material being drilled.

Yet another object of this invention is to provide an improved rotary percussive type rock drill which is simple and economical in use.

Other objects of the invention will appear from the following description and will be more specifically pointed out in the annexed claims.

In the drawings there have been disclosed structures designed to carry out the various objects of the invention, but it is to be understood that the invention is not confined to the exact features shown as various changes and modifications may be made within the scope of the claims.

Figure 3:
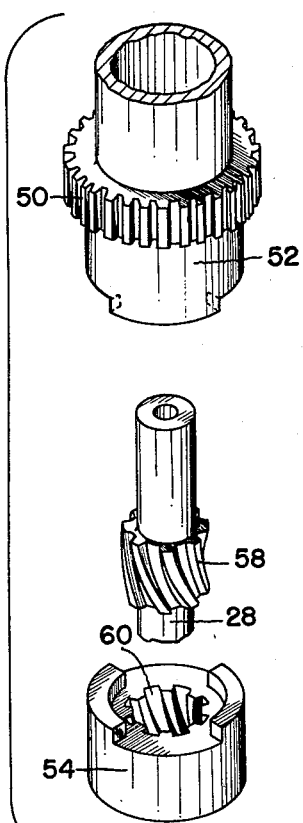
Figure 2:
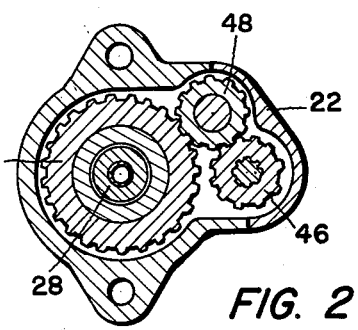
Figure 5:
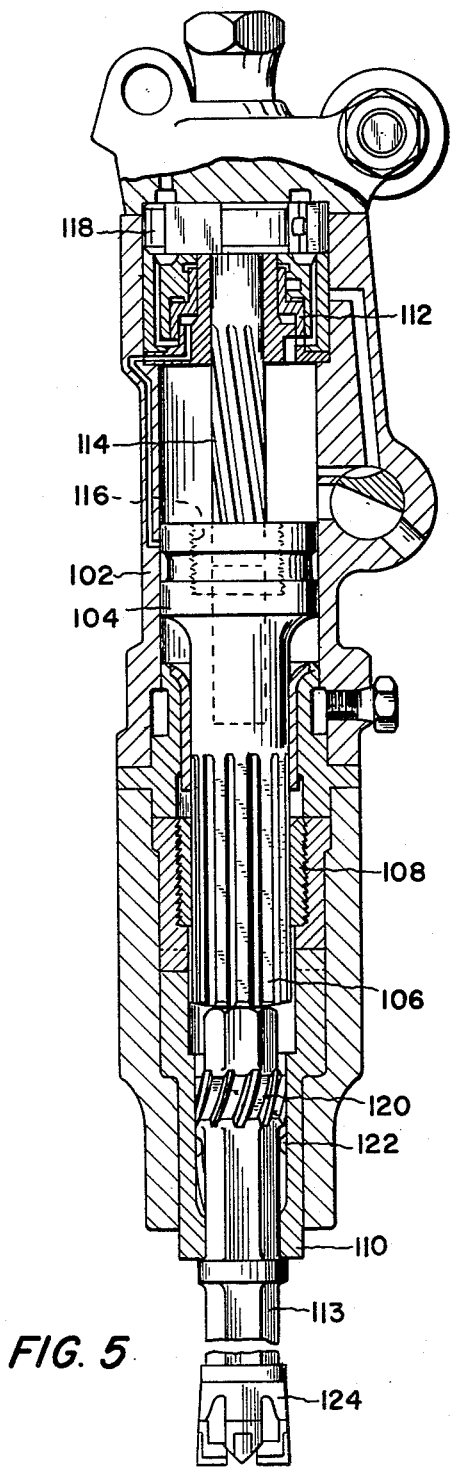
Figure 4:
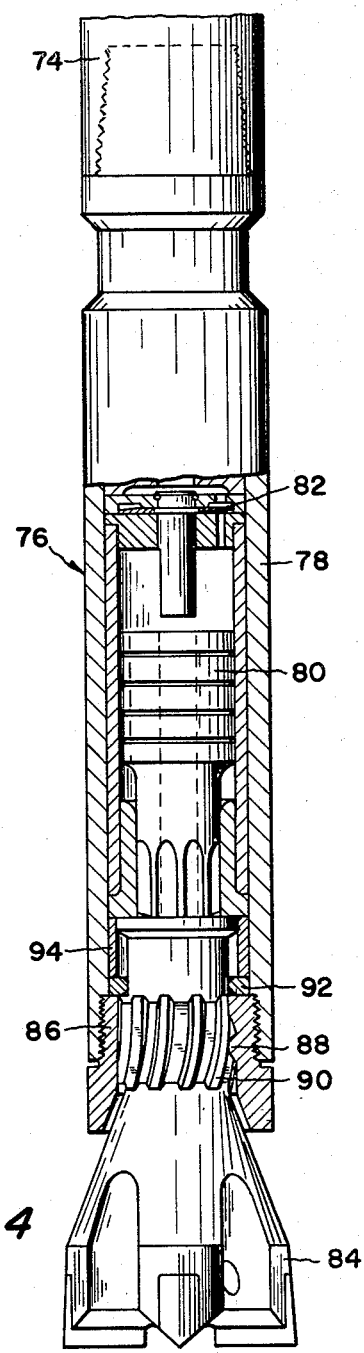

In the accompanying drawings forming part of the specification,

FIG. 1 is a view in longitudinal section of a rotary percussive type rock drill equipped with means to continuously rotate the drill steel, FIG. 2 is a cross sectional view taken on line 2—2 of FIG. 1, and looking in the direction of the arrows, FIG. 3 is an exploded view of the chuck, the rear end portion of the drill steel, and the gearing arrangement between the chuck and the drill steel shown in FIG. 1, FIG. 4 is a view in longitudinal section of a rotary percussive type down-hole drill, and FIG. 5 is a view in longitudinal section of a rotary percussive type rock drill equipped with means for intermittently rotating the drill steel.

Referring to the drawings, FIGURE 1 discloses a preferred embodiment of the invention as applied to a commonly known rotary percussive type rock drill in which the drill steel is continuously rotated while being impacted or actuated by the hammer piston. The subject rock drill, designated by the numeral 20, includes a casing 22 in which is disposed a piston 24 for reciprocation in a cylinder 26. A drilling implement comprising a drill steel 28 provided at its forward end with a drill bit 30 extends into the forward end portion of casing 22 in a position to receive the impact blows of the piston. Motive fluid for operating the piston is supplied to the rock drill at the inlet 32 and controlled by a valve arrangement 34 for distribution to reciprocate the piston in a well known manner.

Rotation is imparted to the drill steel 28 by means of a pressure fluid operated rotary gear type motor 36 of conventional design positioned in the rear end portion of casing 22 for rotating a chuck 38 positioned in the forward end portion of casing 22 and adapted to rotate drill steel 28. Rotation of motor 36 is transmitted to chuck 38 by means of a gear 40 connected to motor 36, gear 42 connected to the rear end of a shaft 44 for driving shaft 44, gear 46 connected to the forward end of shaft 44, intermediate gear 48, and gear 50, the latter being an integral part of chuck 38. Rotation of chuck 38 is transmitted to drill steel 28 by means of a novel arrangement which provides for transmission of rotation of the chuck 38 to drill steel 28 while permitting the drill steel to be rotated in a direction opposite to the normal rotation of the drill steel, and a a velocity equal to the velocity of normal rotation of the drill steel in response to actuation of impact of the drill steel by the piston, as will be explained hereinafter.

Chuck 38 includes a chuck portion 52 of which gear 50 forms a part, and a jaw portion 54 driven by chuck portion 52 by means of a conventional type positive clutch arrangement between the two portions of chuck 38. Transmission of rotation from chuck 38 to drill steel 28 is achieved by means of helical gearing 56 between the jaw portion 54 of chuck 38 and the rear end portion of the drill steel. Gearing 56 includes helical splines and grooves 58 on the rear end portion of the drill steel, and corresponding helical splines and grooves 60 in the jaw portion 54 of chuck 38 for meshing with each other. A bushing 62 is provided rearwardly of jaw portion 54 and positioned in the counterbore 64 of chuck portion 52 between shoulder 66 of counterbore 64 and the rear end surfaces of the outwardly projecting teeth 58 of the drill steel to limit the rearward movement of the drill steel relative to chuck 38 when the drill steel is in a position as shown in FIG. 1.

When looking from the rear end of the rock drill in the direction of the drill bit, the helical gear of the drill steel is right handed, while rotation of the chuck and the drill steel is counter clockwise. It is then readily apparent that, with this helical gearing arrangement on the drill steel and the chuck, forward movement of the drill steel relative to the chuck will effect rotation of the drill steel relative to the chuck in a direction opposite to that of normal rotation of the drill steel by the chuck. As the pitch of the screw thread on the drill steel and the chuck is chosen in accordance with the force of impact of the piston, and with the velocity and direction of normal rotation of the drill steel by the chuck, forward actuation or impact of the drill steel by the piston while the drill steel is being rotated by the chuck in one direction, results in rotation of the drill steel in the opposite direction of normal rotation of the drill steel and at a velocity equal to the velocity of such normal rotation of the drill steel.

This causes the drill steel and the drill bit connected to the forward end of the drill steel, when the drill steel is impacted by the piston for penetration of the drill bit into the material to be drilled, to be rendered rotationally stationary relative to the material being drilled. In this manner, grinding of the drill bit on the face of the material being drilled, and excessive torsion of the drill steel during actuation or impact thereof is eliminated.

Referring to FIG. 4, another application of the invention, as applied to a down-hole type rock drill, is disclosed. With this type of rock drill, rotation of the drill steel is continuous. A rotary motor, not shown, positioned above ground rotatably drives a drill string 74, partly shown, and a conventional type down-hole drill 76 connected to the forward end of the drill string, the down-hole drill being adapted to be inserted into the hole being drilled. The drill comprises an outer casing 78 in which a piston 80 is reciprocated by fluid under pressure valved alternately to opposite ends of the piston by a valve 82. A drilling implement 84, shown in the form of a drill bit, is mounted in the forward end portion of casing 78 with its inner end positioned to be actuated or struck by piston 80.

The drill bit is retained in the casing and engaged for rotation therewith by a chuck member 86 being threaded in the forward end portion of the casing and having internal splines and grooves 88 slidably engaging corresponding splines and grooves 90 in the shank of drill bit 84. A ring member 92 clamped between chuck member 86 and a sleeve 94 is provided for limiting the rearward as well as forward movement of the drill bit in a well known manner.

The important feature of the invention resides in the corresponding splines and grooves 88 and 90 on the chuck member and drill bit, respectively, being helically formed for transmission of rotation from the drill casing to the drill bit in one direction, while providing for rotation of the drill bit in a direction opposite to that of normal rotation of the drill bit, and at a velocity equal to the velocity of such normal rotation of the drill bit, in response to actuation or impact of the drill bit by the piston. With this arrangement, the drill bit is rendered rotationally stationary relative to the material being drilled when struck or actuated by the piston as explained hereinbefore in connection with the device shown in FIGS. 1, 2 and 3.

Yet another application of the invention is shown in FIG. 5, as applied to a rock drill in which rotation of the drill steel and drill bit attached thereto is intermittent, and achieved by means of a commonly known rifle bar and ratchet arrangement. The rock drill shown in FIG. 5 comprises a cylinder 102 provided with a reciprocating piston 104 having a forward fluted extension 106 which cooperates slidably with a correspondingly fluted chuck nut 108 in the forward end portion of the cylinder. Chuck nut 108 is arranged rotatably within the cylinder and has its forward end cooperating with the rear end of chuck part 110 to provide a conventional positive clutch between the chuck nut and the chuck part.

Reciprocation of piston 104 is controlled by a valve arrangement 112 which distributes pressure fluid alternately to the opposite ends of the piston in a commonly known manner. A drilling implement including a drill steel 113 provided at its forward end with a drill bit 124 is mounted in the forward end portion of the cylinder with its inner end positioned to be struck by the piston.

Piston 104 is rotated intermittently by means of a helically fluted rifle bar 114 cooperating with corresponding helical grooves 116 formed in the piston, and with a ratchet arrangement 118 operatively connected to the rifle bar, with which arrangement the rifle bar is held stationary while the piston is rotated (moved in a spiral direction about the rifle bar) during the forward or impact stroke of the piston. During the rearward stroke of the piston, the rifle bar is permitted to rotate and the piston is held rotationally stationary while moving upwardly. It is then readily apparent that, during each forward stroke of the piston, chuck part 110 is rotated in response to rotation of the piston to rotate the drill steel 113 and the drill bit 124 attached to the forward end of the drill steel.

The drill steel 113 extends into the chuck part 110 and is engaged for rotation therewith by means of helical splines and grooves 120 on the drill steel cooperating with corresponding helical splines and grooves 122 in the chuck part 110. Rotation of the piston is transmitted to the drill steel by means of the chuck nut 108, chuck part 110, and cooperating helical splines and grooves between chuck part 110 and the drill steel.

When the drill steel is actuated or struck by the piston during rotation of the drill steel by the piston, the drill steel is moved forwardly. This results in rotation of the drill steel in a direction opposite to that of normal rotation of the drill steel, and at a velocity equal to that of such normal rotation of the drill steel. This provides for the drill steel and the drill bit 124 connected thereto to be rendered rotationally stationary relative to the material being drilled when actuated or struck by the piston for penetration of the drill bit 124 into the material being drilled.

Thus, by the above construction are accomplished, among others, the objects and advantages hereinbefore referred to.

I claim:
1. In a rock drilling tool comprising,
   (a) a casing and a piston disposed in said casing for reciprocation therein,
   (b) a drilling implement extending in said casing to be intermittently axially moved by said piston,
   (c) means to rotate said drilling implement in one direction,
   (d) a first cam means in said casing, and
   (e) a second cam means on said drilling implement complementary to said first cam means and coacting with the latter upon axial movement of said drilling implement to render the drilling implement rotationally stationary by tending to rotate said drilling implement at an angular velocity equal to and in a direction opposite to the rotation of the drilling implement in said one direction.

2. In a rock drilling tool comprising,
   (a) a casing and a piston disposed in said casing for reciprocation therein,
   (b) a drilling implement extending in said casing to be intermittently axially moved by said piston relative to said casing,
   (c) means to rotate said drilling implement in one direction,
   (d) a first helically formed camming means fixedly secured in said casing, and
   (e) a second helically formed camming means carried by said drilling implement complementary to the first helically formed camming means and coacting with the latter upon axial movement of said drilling implement to tend to rotate said drilling implement at an angular velocity to counteract the angular velocity of the drilling implement in said one direction so that the drilling implement is rotationally stationary.

3. In a rock drilling tool comprising,
   (a) a casing and a piston disposed in said casing for reciprocation therein,
   (b) a drilling implement having its rear end portion extending in said casing to be intermittently axially moved by said piston,
   (c) a rotatable chuck positioned in the forward end portion of said casing to receive the rear end portion of said drilling implement,
   (d) means to rotate said chuck in one direction, (e) a first cam means carried by said chuck, and
(f) a second cam means carried by the rear end portion of the drilling implement and complementary to said first cam means and coacting with the latter to transmit the rotation from said chuck to said drilling implement in said one direction,
(g) said first cam means and said second cam means being inclined so as to cooperate upon axial movement of said drilling implement to render the latter rotationally stationary by tending to rotate the drilling implement at an angular velocity equal to and in a direction opposite to the rotation of the drilling implement in said one direction.

4. In a rock drilling tool comprising,
(a) a casing and a piston disposed in said casing for reciprocation therein,
(b) a drilling implement having its rear end portion extending in said casing to be intermittently linearly moved by said piston,
(c) a rotatable chuck positioned in the forward end portion of said casing to receive the rear end portion of said drilling implement,
(d) means to rotate said chuck in one direction,
(e) first helical threads on said chuck, and
(f) second helical threads carried by the rear end portion of said drilling implement and meshing with said first helical threads to transmit the rotation of said chuck to said drilling implement in said one direction,
(g) said first and second helical threads being pitched so that the first and the second helical threads coact upon linear movement of the drilling implement and tend to rotate the latter at an angular velocity equal to and in a direction opposite to the rotation of the drilling implement in said one direction to render the latter rotationally stationary.

5. In a rock drilling tool comprising,
(a) a casing and a piston disposed in said casing for reciprocation therein,
(b) a drilling implement having its rear end portion extending in said casing to be intermittently axially moved by said piston,
(c) a rotatable chuck positioned in the forward end portion of said casing to receive the rear end portion of said drilling implement,
(d) means to continuously rotate said chuck in one direction,
(e) first splines on said chuck, and
(f) second splines on the rear end portion of the drilling implement and meshing with said first splines to effect the transmission of the rotation from said chuck to said drilling implement in said one direction,
(g) said first and said second splines being pitched so as to provide coaction therebetween upon axial movement of said drilling implement to render the latter rotationally stationary by tending to rotate the drilling implement at an angular velocity equal to and in a direction opposite to the rotation of the drilling implement in said one direction.

6. In a rock drilling tool comprising,
(a) a casing and a piston disposed in said casing for reciprocation therein,
(b) a drilling implement extending into said casing to be intermittently engaged by said piston and thereby axially moved relative to said casing,
(c) means to rotate said drilling implement in one direction,
(d) first helical splines in said casing, and
(e) second helical splines carried by said drilling implement and mating with said first helical splines so that upon axial movement of said drilling implement said first and said second helical splines coact to tend to rotate said drilling implement at an angular velocity equal to and in a direction opposite to the rotation of the drilling implement in said one direction whereby said drilling implement is rotationally stationary.

References Cited by the Examiner
UNITED STATES PATENTS

| | | | |
|---|---|---|---|
| 1,899,438 | 2/33 | Grant | 173—105 |
| 2,608,181 | 8/52 | Curtis et al. | 173—111 |
| 3,082,741 | 3/63 | Huffman | 173—97 |

BROUGHTON G. DURHAM, *Primary Examiner.*